United States Patent [19]

Dondero

[11] Patent Number: 5,235,638
[45] Date of Patent: Aug. 10, 1993

[54] TELEPHONE NETWORK INTERFACE

[75] Inventor: Paul C. Dondero, Vineland, N.J.

[73] Assignee: Bell Atlantic Network Services, Inc., Arlington, Va.

[21] Appl. No.: 758,052

[22] Filed: Sep. 12, 1991

[51] Int. Cl.$^5$ .................................................. H04M 1/00
[52] U.S. Cl. ................................... 379/399; 379/412; 379/325
[58] Field of Search ............... 379/399, 412, 326, 327, 379/328, 329, 330, 331

[56] References Cited

U.S. PATENT DOCUMENTS

| | | |
|---|---|---|
| 3,936,133 | 2/1976 | Splitt et al. |
| 4,488,088 | 12/1984 | Paget |
| 4,500,158 | 2/1985 | Dola |
| 4,605,275 | 8/1986 | Pavel |
| 4,647,725 | 3/1987 | Dellinger |
| 4,658,422 | 4/1987 | Sparks |
| 4,712,232 | 12/1987 | Rodgers |
| 4,749,359 | 6/1988 | White |
| 4,752,249 | 6/1988 | Unger et al. |
| 4,890,318 | 12/1989 | Crane et al. ............... 379/399 |
| 4,919,544 | 4/1990 | Graham |
| 4,945,559 | 7/1990 | Collins et al. |
| 4,945,560 | 7/1990 | Collins et al. ............... 379/399 |
| 4,949,376 | 8/1990 | Nieves et al. |
| 4,979,209 | 12/1990 | Collins et al. |

*Primary Examiner*—James L. Dwyer
*Assistant Examiner*—Paul A. Fournier
*Attorney, Agent, or Firm*—Lowe, Price, LeBlanc & Becker

[57] ABSTRACT

A telephone network interface apparatus comprising a cabinet housing a chassis having a planar surface with openings to receive one or more modular terminal panels. The cabinet includes a splicing chamber at one side to receive incoming telephone company cables for connection to the module panel terminals therein. The module terminal panels comprise self-supporting panels carrying protector and electronics fields formed by plug-in type blocks for receiving protector plugs and electronics plugs respectively. A housing encloses the protector and electronics fields and is provided with a lockable door to form a telephone company compartment. Also mounted on the panel is a network interconnection device (NID). The NID is removably attached to the panel by a bracket and mating type connector. The NID includes plug-in jack connections such as RJ11s. The protector and electronics plug-in sockets are wired in series with the NID RJ11 connectors. The capacity of the building entrance terminal may be increased by adding modular panels as the need arises. The cabinets may be utilized either indoors or outdoors and may be wall or pedestal mounted. The modular construction provides for economical and quick replaceability of components.

36 Claims, 6 Drawing Sheets

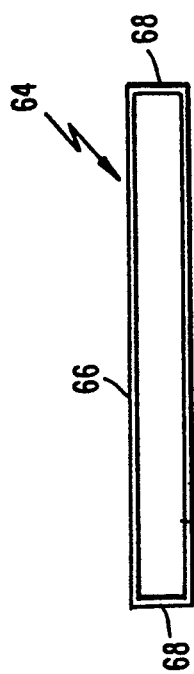
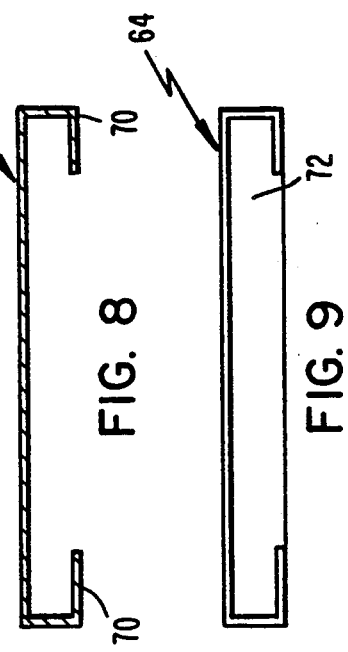
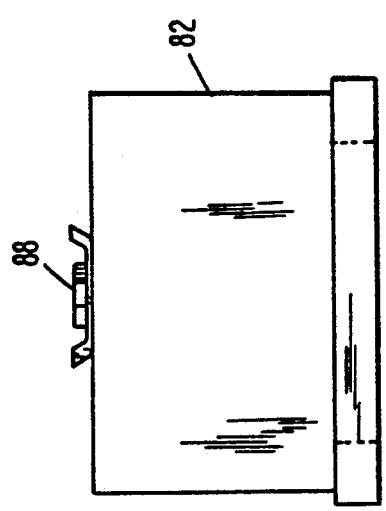
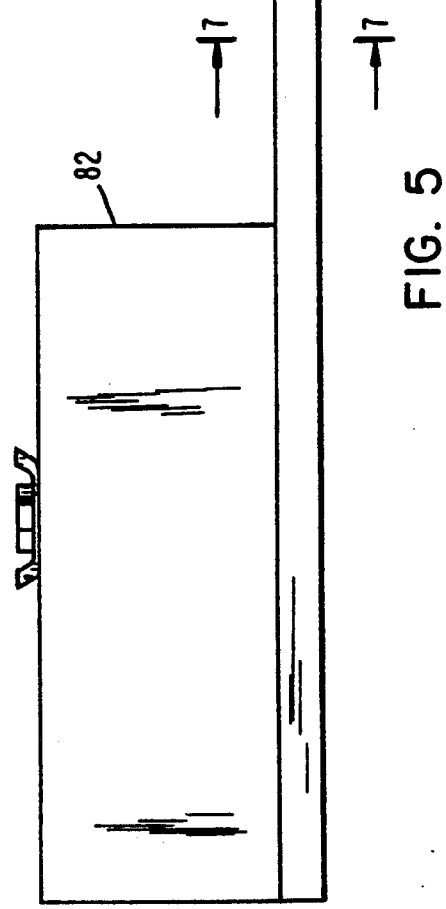
FIG. 7
FIG. 8
FIG. 9
FIG. 6
FIG. 5

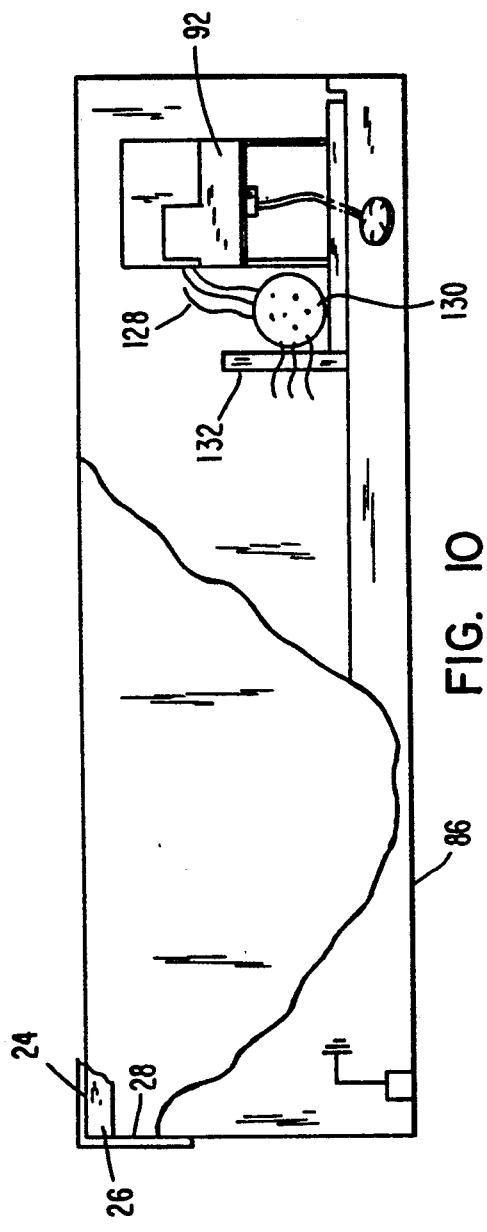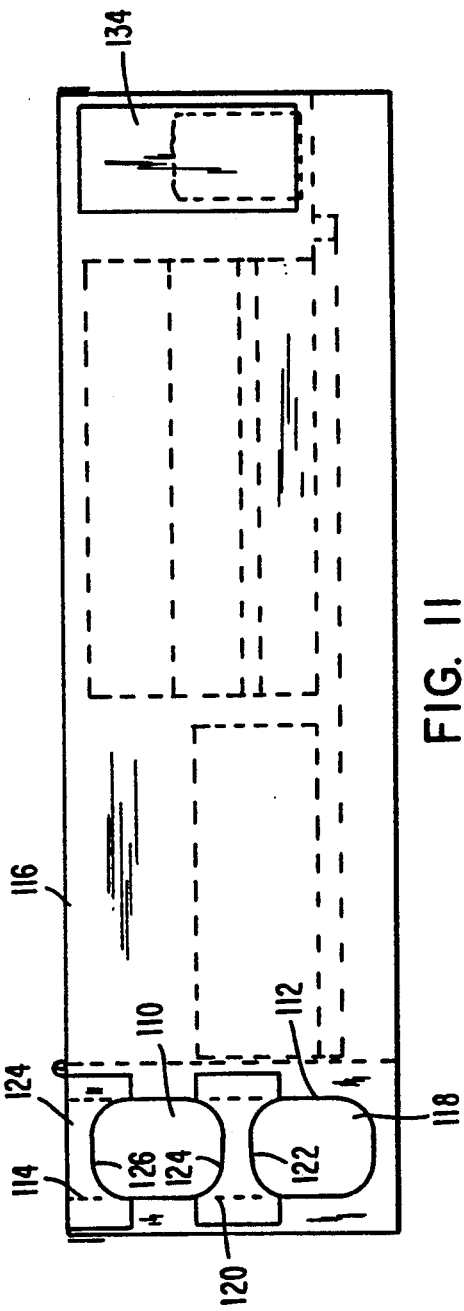

TELEPHONE NETWORK INTERFACE

TECHNICAL FIELD

This invention relates generally to new and improved telephone network interface apparatus and more particularly relates to new and improved telephone network apparatus for interconnecting incoming telephone company wiring to subscriber premises wiring and for providing a demarcation point to selectively allow for both individual subscriber and telephone company personnel to obtain access to the interior of the apparatus.

BACKGROUND ART

Since divestiture it has been possible for telephone subscribers to own their own equipment and to connect such equipment to the incoming telephone lines of the operating company. This has created the necessity of providing a demarcation point to facilitate determination of whether a fault exists on the incoming telephone line or the subscriber premises line. Typically this is currently provided by telephone network apparatus mounted at the subscriber premises which includes a terminal box having both telephone company and subscriber compartments for mounting the respective telephone company and subscriber terminals and other equipment. Typically separate doors or covers close the compartments and provide access to the telephone company and subscriber respectively.

A telephone jack is normally provided for connection to the incoming telephone line and a telephone plug for connection to the subscriber premises line. Upon the telephone jack and plug being connected to such lines and the plug being plugged into the jack a telephone connected to the subscriber premises line is rendered operable. Should the telephone become inoperable the telephone plug is unplugged from the telephone jack and provides a demarcation point to permit the plug of an operating telephone to be plugged into the jack to facilitate determination of whether a fault exists on the incoming telephone line or the subscriber premises line. Representative of such prior art telephone network interface apparatus or devices are those described in U.S. Pat. Nos. 4,488,088 issued Dec. 11, 1984; 4,500 58 issued Feb. 19, 1985 and 4,647,725 issued Mar. 3, 1987.

Generally devices of this type are most suited to subscriber premises having a relatively small number of incoming telephone lines interconnected to a matching number of subscriber premises lines. However the telephone network system serves a large variety of customers including office buildings, condos, apartments and the like wherein it is necessary to terminate 25, 50 or perhaps hundreds of incoming telephone lines for interconnection with an equally large number of subscriber premises lines.

Generally speaking existing interface devices are designed to accommodate 25 or 50 or less lines. Where additional lines are to be served additional interfaces are required.

Exemplary illustrations of currently used or proposed devices are provided in the following:

U.S. Pat. No. 4,658,422, issued Apr. 14, 1987, shows a terminal box having a 2-part outer cover connected by a hinge. The box with the cover removed comprises a right chassis in the right compartment and a left chassis in the left compartment. The two chassis are hinged together. The left chassis may be raised to gain access to the interior of the underlying compartment as seen in FIG. 4. A terminal block is mounted on the chassis in the subscriber's compartment of the box and this is used for connecting the subscriber's telephones. The terminal block provides connections for up to 25 telephones. A protector block is mounted on chassis in the telephone company compartment. The terminal block in the subscriber compartment is factory wired to contacts on the under side of the protector block as shown in FIG. 8. The back of the protector block may be encapsulated. The telephone cables enter the telephone company compartment through a bushing beneath the protector block and are spliced to a connector attached to the under side of the protector block. No provision is made for an electronics field. The terminal boxes are provided as completed units and expansion is accomplished by adding additional stacked boxes.

U.S. Pat. Nos. 4,979,209 and 4,945,559, issued Dec. 18, 1990, and Jul. 31, 1990, show a network interface device which includes a base, a telephone company cover and a subscriber cover. The telephone company compartment has terminals for connecting to incoming telephone company lines or wiring and includes protector devices. The protector devices are not of the modular plug-in variety. The subscriber compartment contains terminals for connection to subscriber premise lines or wiring. The terminals include pairs of terminals mounted on a plurality of replaceable individual subscriber line modules shown in FIGS. 7–10. Each module is box-like and hollow to provide an internal space (FIG. 8) for receiving a telephone circuit comprising the so-called "electronics". These electronics are thus provided on the subscriber side and may be changed only by changing the entire subscriber line module. The modularity and removability of the individual subscriber line modules is a basic feature of this device. The interface shown accommodates from 1–6 subscriber lines.

U.S. Pat. No. 4,949,376, issued Aug. 14, 1990, shows a telephone interface terminal having separate telephone company and subscriber access. Several different cover hinging arrangements are shown. The specific embodiment is adapted to handle five subscriber lines and the subscriber line connections are provided in the form of modules adapted to be used with terminal blocks referred to in the art as 66 blocks. The modules are provided with space for housing electronics circuits.

U.S. Pat. No. 4,919,544, issued Apr. 24, 1990, shows a retrofit apparatus for mounting on a conventional 66 block to provide a demarcation point. The retrofit modules are provided with space for mounting electronics circuits. This device deals with the problem of providing a demarcation point for 25, 50, etc. multi-line terminal blocks previously installed. Such multi-line terminals found at office buildings, apartments, etc., present different problems from the relatively limited number of lines handled by the devices described in the prior patents discussed above.

U.S. Pat. No. 4,752,249, issued Jun. 21, 1988, shows a telephone distribution frame connector which includes a module field, a test field and an equipment field. A module field block is provided which mounts on the outer side thereof a plurality of over voltage or surge protector modules. A field test block and equipment field block are mounted at right angles to the module block.

U.S. Pat. No. 4,605,275, issued Aug. 12, 1986, shows a modular encapsulated cross-connect terminal unit for mounting in a cross-connect terminal.

U.S. Pat. No. 3,936,133, issued Feb. 3, 1976, shows a connector block for mounting plug-in type protector assemblies.

U.S. Pat. No. 4,712,232, issued Dec. 8, 1987, shows an 89 mounting bracket and a multiple telephone jack slide assembly. Each telephone jack is coupled by color coded wires to rows of terminals provided by a punch down terminal board. Similarly each of the mating telephone plugs is coupled by color coded wires to associated rows of terminal provided by a punch down terminal board.

U.S. Pat. No. 4,749,359, issued Jun. 7, 1988, shows a telephone network interface device having separate telephone company and subscriber compartments and containing individual access doors.

In addition to the foregoing some interface arrangements in use today have provisions to install electronic devices such as Radio Frequency Interference (RFI) filters within the cabinet on binding posts or a punch-down block. In this configuration the electronics termination point is located between the protector field and the subscriber wire termination field. This has the practical effect of creating a miniature cross-connection fixture, which results in record keeping problems for both the assignment and repair bureaus. When several electronic devices are terminated on the field provided for this purpose the terminal fixture tends to become what is known colloquially as a "rat's nest".

Some interfaces are made with Network Interface Devices (NIDs) such as RJ11s hardwired into the cabinet. These cabinets are used in applications where limited space is provided for telephone company use by the subscribers. The NIDs in these cabinets are equipped with lugs or binding posts known as an entrance bridge. The entrance bridge, typically a so-called 66 block, is where the subscribers terminate their service wires. When the NID is a component of the terminal provisions are made in the cabinet to deny the subscriber access to all network component areas while providing the subscriber ready access to the NID itself in order to terminate and test their customer premises equipment. Terminals in this configuration are relatively expensive. Also the NID component itself is susceptible to damage since this unit is handled by the subscriber rather than a trained telephone technician. The NID is an integral component when included in the available terminal configuration so that when the NIDs are damaged the entire terminal may have to be replaced at substantial cost.

The disadvantages of existing building entrance terminals (BETs) include the following:

Existing BETs utilized for interior, exterior or pedestal mount applications differ greatly in design, size and components.

The largest known available outdoor unit handles 50 lines.

When electronics fields are included in existing BETs, the BET becomes a cross-box which introduces severe records problems in the assignment and repair service bureaus.

When pig-tailed type electronics are placed in the provided fields in existing BETs a wiring rat's nest is created.

Existing BET product as currently designed cannot be expanded with an increase in service requirements. If a 25 line fixture is installed and additional service is required a second fixture is necessitated.

Components in existing BET products cannot be easily replaced when damage occurs. The NIDs are usually part of the cabinet.

Existing BETs have a substantial initial cost and since the components cannot be readily repaired or replaced they also have a potentially high maintenance cost.

DISCLOSURE OF THE INVENTION

It is a principal object of the present invention to provide a new and improved building entrance terminal which will eliminate or alleviate the foregoing problems.

It is another object of the invention to provide such a terminal which is modular in design, craft friendly, lower in additional as well as maintenance cost, expandable, and similar for indoor and outdoor applications.

It is yet another object of the invention to provide an improved building entrance terminal which entails less training requirements, and fewer installation and maintenance procedures.

It is another object of the invention to provide a single building entrance terminal unit capable of expanding from 25 to 100 lines without the necessity of mounting additional terminals.

It is another object of the invention to provide such a terminal wherein lines are interconnected in discrete units such as by 25 line module chassis, plates or panels with the capacity for utilizing four such panels in a unit.

It is another object of the invention to provide an improved building entrance terminal having both protector and electronics fields constructed in such a manner as to preclude cross-connects or the use of loose wires individually terminated.

It is another object of the invention to provide a terminal of the foregoing type wherein the electronics devices are in the form of plug-in modules which are interchangeable with metallic test units (MTUs).

A telephone network interface apparatus according to the present invention may comprise a terminal enclosure or cabinet having a base or wall with an outwardly extending wall circumscribing the back wall to form top and bottom and side walls. These are joined to a front wall having an openable door or cover. Mounted within the cabinet is a chassis extending generally parallel to the back wall and adapted to receive a plurality of module panels. The module panels are generally rectangular in shape and carry at one side a box or other enclosure for housing a telephone company compartment. The box or housing is provided with a hinged or otherwise openable door or cover having a locking mechanism.

Mounted on the module panel within the telephone company compartment are side-by-side protector and electronics fields comprised of plug-in blocks forming a protector block and an electronics block respectively. Adjacent the housing on the module panel there is provided a suitable bracket for removably receiving a NIDs unit such as a 25 pair unit of the 8925 type. The mounting bracket may comprise an 89 or 89B bracket.

The module panel is provided with a port through which a cable extends from the top side to the bottom side. The bottom side terminus of the cable is hardwired to the electronics plug-in block. The top side terminus of the cable is connected to a suitable connector such as an RJ21 connector which is connectable to the ID. The passage of the cable through the module port is weatherproofed The plug sockets in the electronics field are hard wired to respective sockets in the protector field. The other side of the protector sockets are hardwired to one end of a cable which is itself terminated in a splice connector such as a 710, 4005 or MS2 connector. The cabinet is provided with an internal splice chamber wall that extends parallel to a side wall of the cabinet between the base or back wall of the cabinet and the under side of the chassis.

A cable entry port is provided in the bottom wall of the cabinet through which one or more telephone company cables pass for connection to the splice connectors in the splice chamber. The cable in the cabinet which terminates in the splice connectors in the splice chamber extends through suitably grommeted or otherwise sealed openings in the inner splice chamber wall. The side of the cabinet opposite to the splice chamber is provided with suitable wire retainers or rungs for receiving the subscriber premises wiring. A suitable port is provided in the lower wall of the cabinet through which the subscriber premises wiring cable may exit in a weather-tight fashion.

With this arrangement it is possible utilize a single size building entrance terminal cabinet to provide connection for 25 to 100 lines without the necessity of adding additional units. Obviously larger enclosures can be provided if desired. The provision of connections for additional lines involves the simple procedure of installing one or more additional module panels as additional connections are needed. The module panels may be provided as standard units available for virtual immediate delivery. In a similar manner the NIDs themselves are plug-in units susceptible to virtually instant replacement. Protectors may be replaced where necessary and electronics units installed in the desired manner to suit the needs of the individual lines. The creation of a wiring cross-connect and rat's nest is precluded by the design of the unit.

BRIEF DESCRIPTION OF DRAWINGS

FIG. 5 is a side elevation showing the terminal panel of FIG. 4 having a telephone company enclosure mounted thereon.

FIG. 6 is an end elevation of the terminal plate of FIG. 5 showing the telephone company enclosure mounted thereon.

FIG. 7 is an end elevation view of the terminal panel used in the terminal panel module of FIGS. 1–6.

FIG. 8 is a vertical section through the terminal plate of FIG. 5 along the lines 7—7.

FIG. 9 is an end elevation view of the opposite end of the terminal panel of FIG. 5 from the end view of FIG. 7.

FIG. 10 is a side elevation view of the building entrance terminal of FIG. 1, partly in section and partly broken away, showing the terminal panel module chassis and NID mounted thereon.

FIG. 11 is a bottom view of the building entrance terminal of FIG. 1 showing the cable entrance ports.

BEST MODE FOR CARRYING OUT THE INVENTION

Figure 1:
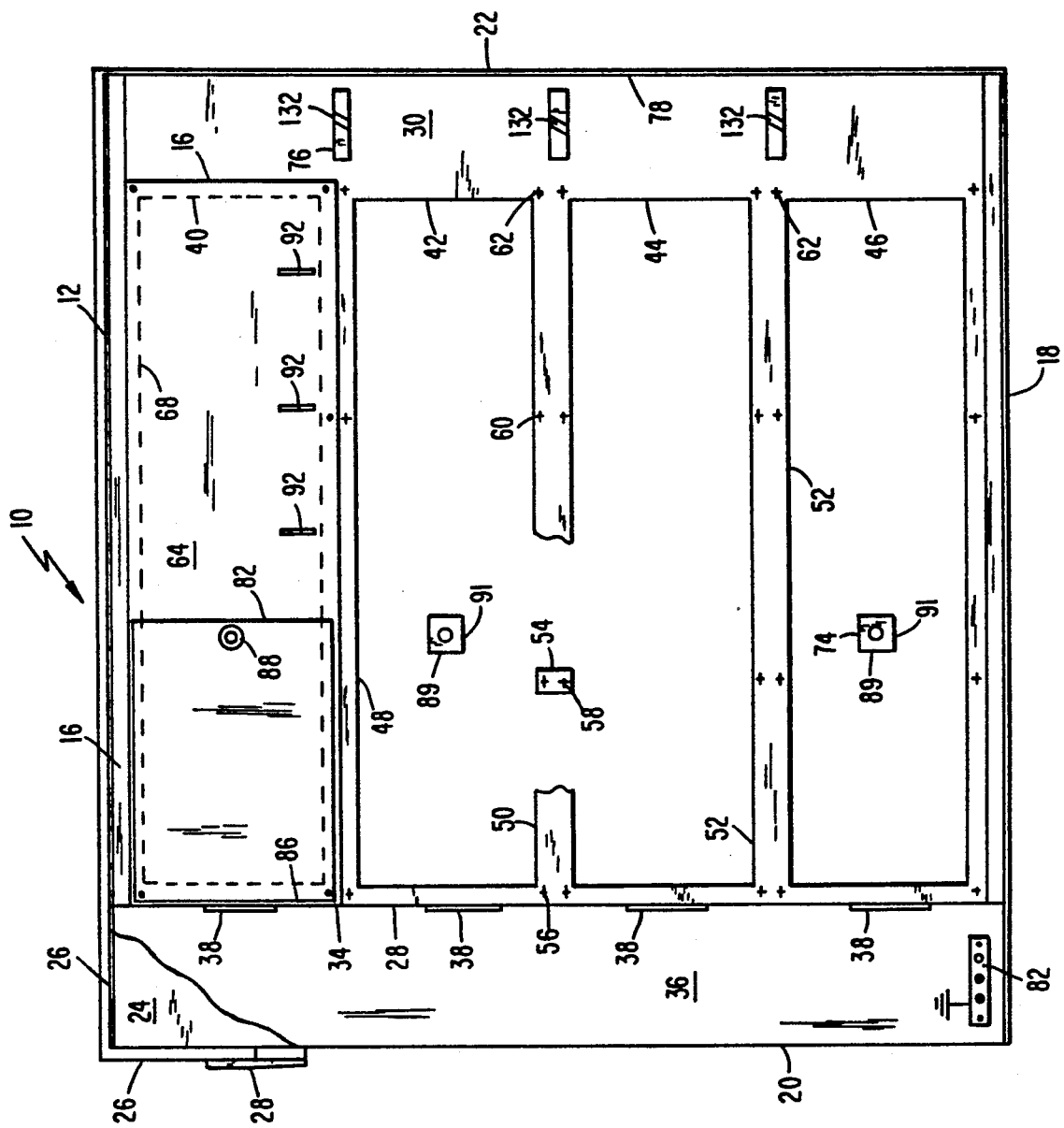
FIG. 1 is a front elevation showing a building entrance terminal constructed according to the invention with one terminal panel module mounted and showing the mounting chassis with openings for mounting additional module panels.

Referring to FIG. 1 there is seen the front elevation of a building entrance terminal (BET) shown generally at 10 constructed according to the invention. The BET comprises a generally rectangular cabinet 12 having a back wall 14, top and bottom walls 16 and 18 and side walls 20 and 22. The cabinet may be economically formed of sheet metal with the peripheral top, bottom and side walls being bent and welded. For a four module cabinet designed for four 25 pair module panels the cabinet may be by way of example approximately 23 inches wide, 25 inches high and 8 inches deep.

The cabinet 12 may be provided with a hinged closure door shown partially in FIG. 10 at 24. The door is preferably flanged on all peripheral sides as indicated at 26 and may be hinged to the cabinet by hinges 28. The door also may be of bent and welded sheet metal construction with the hinge 28 bolted or welded to the cabinet side 20. While sheet metal represents a preferred type construction the cabinet may also be formed by other methods such as from cast metal or synthetic resin. The cabinet is adapted to be mounted to an internal or external wall of the building to which connection is being made or may be mounted to or on a pedestal either indoors or outdoors.

The cabinet 12 has a panel mounting chassis 30 (FIGS. 1 and 3) mounted therein and extending parallel to the back or base 14 to form therebetween a wiring chamber 32. Referring to FIG. 1 the mounting chassis 30 extends from the right side wall 22 to an upstanding separator or splice chamber wall 34 extending parallel and proximate to the side wall 20. The interior splice chamber wall 34 and cabinet side wall 20 form therebetween the splice chamber 36. The splice chamber wall 34 may extend to the front of the cabinet 12 for closure by the cabinet door 24 or may terminate short of the front of the cabinet and be provided with a separate splice chamber door (not shown). Grommeted cable ports 38 are provided in the splice chamber wall 34 near the back or base 14 of the cabinet 12 for a purpose to be described. The mounting chassis 30 and splice chamber wall 34 may preferably be formed of sheet metal which may be welded or flanged and bolted into position in the cabinet. By way of example the splice chamber 36 may be approximately 4 inches in width for a four terminal panel module BET of the type illustrated in FIG. 1.

Mounting chassis 30 is provided with four rectangular cut out openings 40, 42, 44 and 46 which may for example be approximately 5×19 inches in dimension. Webs 48, 50 and 52 separate the inner wall edges of the openings and may be supported from the back of the cabinet by upstanding web supports 54 shown beneath a broken away portion of web 50. Web supports 54 may be provided in any number necessary to insure adequate rigidity and support. In the cabinet illustrated the supports may be arranged four to a web for securement by suitable screws in mounting holes 56, 58, 60 and 62.

Referring to FIG. 1 there is shown mounted over and upon opening 40 a terminal module panel 64. The panel 64 may be formed from sheet metal in the manner shown in FIGS. 7, 8 and 9. Referring to those figures the panel is seen to comprise a mounting plate or surface 66 having edge flanges 68 extending downwardly from the long parallel edges thereof nd bent inwardly to form inwardly extending langes 70 best seen in FIG. 8. End flanges 72 extend downwardly at the distal ends of the panel 64 covering the end edges of the flanges 68 and 72. The flange edges may be welded for rigidity. This construction provides a self-supporting panel module susceptible to easy handling without damage.

Figure 3:
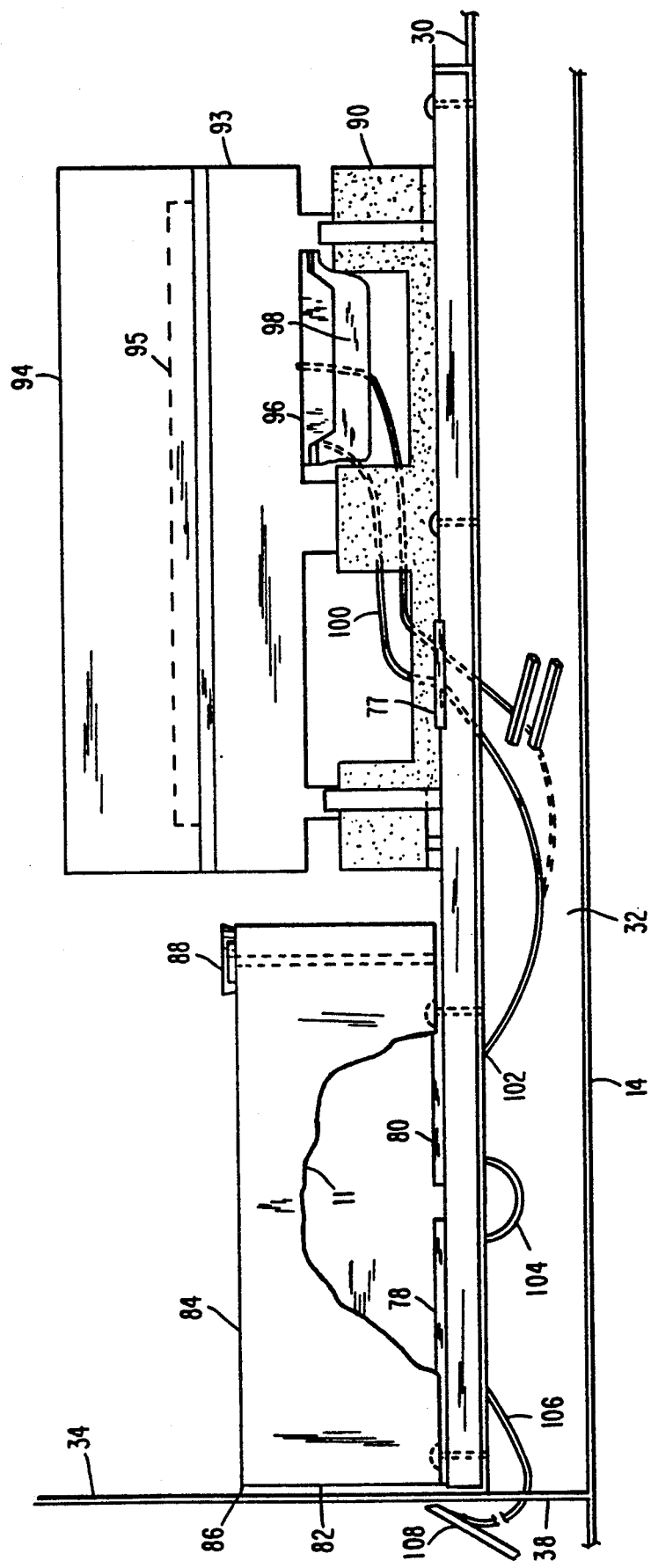
FIG. 3 is a side elevation, partly in section and partly in a broken away portion, showing a terminal panel module mounted in a building entrance terminal according to the invention with the BET shown in section.
Figure 4:
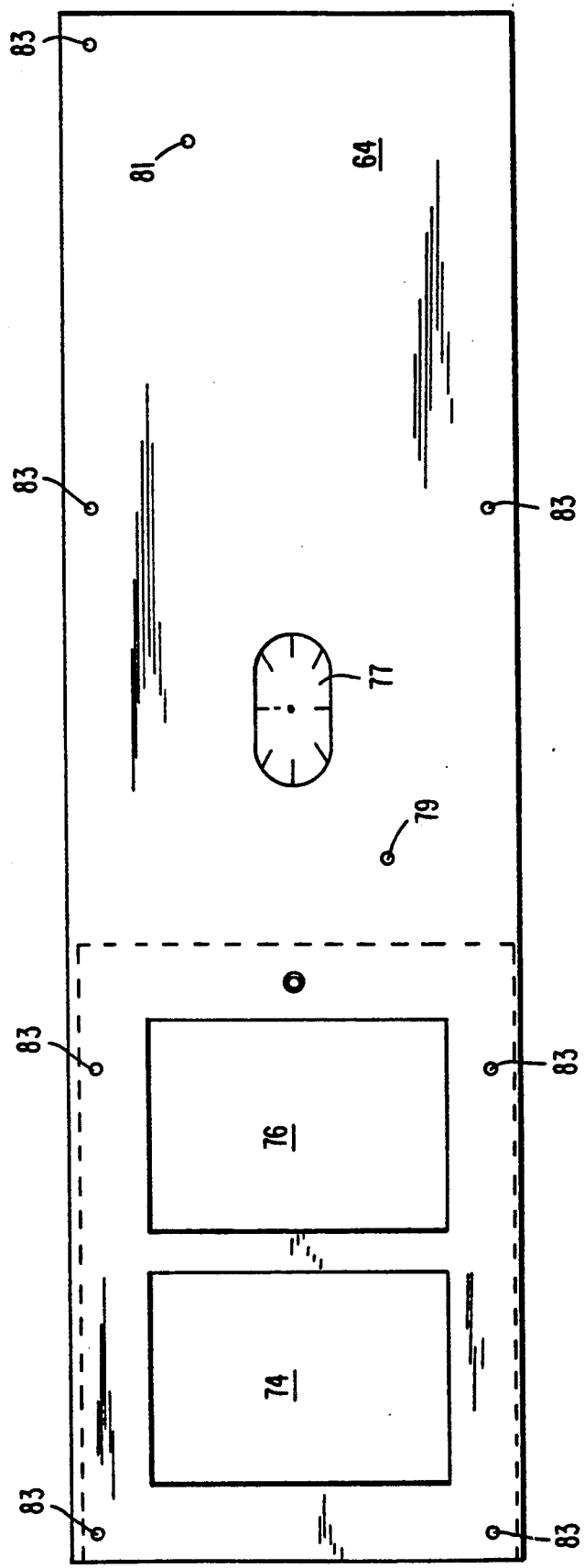
FIG. 4 is a top plan view of a terminal panel constructed according to the invention.

Referring to FIG. 4 there is shown a panel module plate 64. It will be seen that the left-most end of the panel is provided with a pair of rectangular openings 74 and 76 for receiving plug in connector blocks. For a 25 pair panel module the openings 74 and 76 may each receive a 25 pair 5 pin connector block such as are shown mounted at 78 and 80 in FIG. 3. According to the invention the block 78 forms the protector field and the block 80 forms the electronics field. The block 78 is adapted to receive conventional 5 prong plug in protectors of the type shown by way of example in U.S. Pat. No. 3,936,133. Obviously other forms of plug-in or the like arrangements may be used.

According to the invention the electronics units such as radio frequency filters and other common electronic circuits ar mounted in plug in units of the same type for installation in the electronics field plug in block 80. Also provided for plug in block 80 are similar plug in units carrying jumper connections for use on lines where electronics are not needed. It is to be understood that reference to electronics plugs includes such jumper type plugs.

Also provided in the panel module 64 is a grommeted cable port 77 and bracket mounting screw holes 79 and 81. Mounting holes 83 are provided along the edges of the panel for securing the panel module to the chassis 30.

The protector field and electronics field represented by plug in blocks 78 and 80 constitute the telephone company compartment of the building entrance terminal cabinet. As such it is desired to provide means for limiting subscriber access. This may be accomplished by one or more internal enclosures or housings. In the specific embodiment of the invention illustrated this constitutes a generally rectangular box or housing 82 seen in FIGS. 1, 2, 3, 5 and 6. The housing 82 may be formed of sheet metal flanged at its lower edges for fastening to the module panel 64 as by bolts, rivets or the like. The housing 82 is provided with a suitable cover 84 which may be hinged at its left-most edge 86 and locked as with a Sims fastener 88.

Suitable nuts 89 are provided on posts 91 extending up from the cabinet floor for receiving the distal ends of the Sims screws.

The cover 84 forms a weatherproof seal with the housing 82 the housing 82 is in turn secured to the module panel 64 in weatherproof fashion such as through the use of a suitable gasket.

The enclosure or housing 82 may by way of example be approximately 8 inches long, 3 inches high and 5 inches wide. While one single housing is shown enclosing both the protector and electronics fields it is also within the contemplation of the invention to provide separate housings for the protector and electronics fields if desired.

Figure 2:
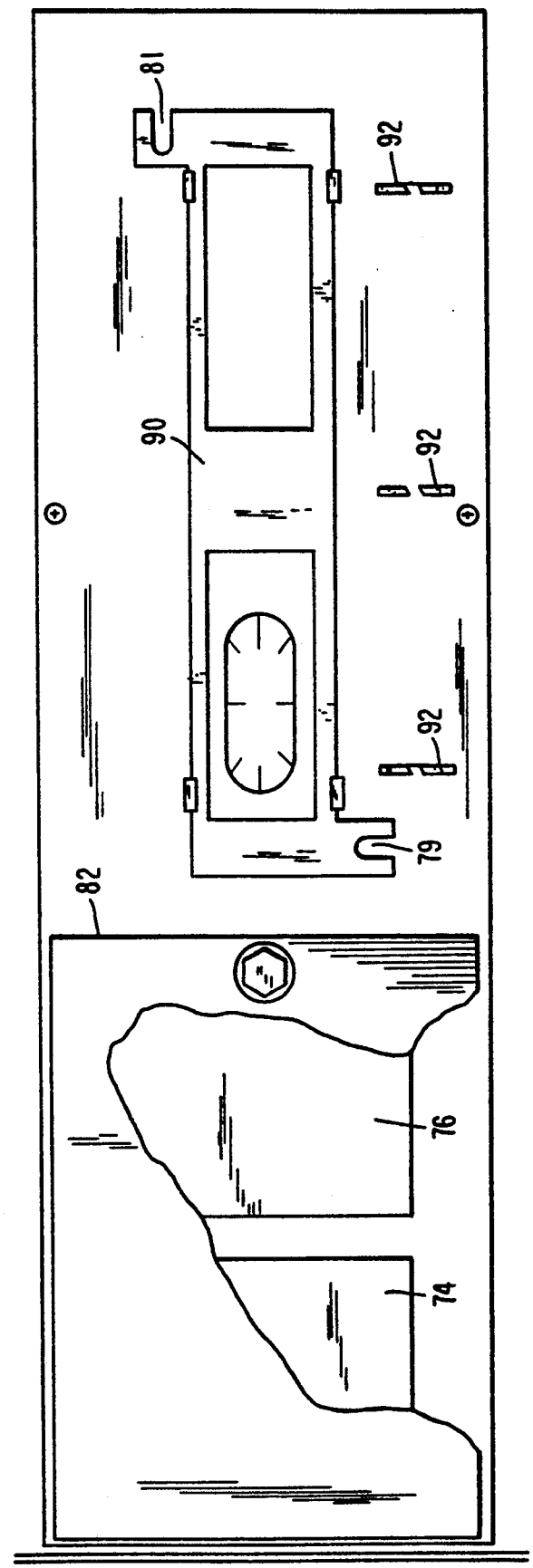
FIG. 2 is a top plan view of a terminal panel module constructed according to the invention shown partly in section and partly in a broken away portion.

Referring to FIG. 3 a mounting bracket 90, which may be of the 89 or 89B type, is fastened to the module panel by suitable screws fastened in openings or screw holes 79 and 81. Conventional cabling devices or wire rungs 92 are provided on the module plate below the bracket 90 as seen in FIG. 1 and 2. Preferably the rungs are spaced and lie along a line which extends substantially parallel to the longitudinal axis of the 89 bracket 90.

Referring to FIG. 3, there is mounted in the 89 bracket 90 a 25 pair NID 93 which may be of the 8925 type having a cover 94. The NID is provided with one half of an RJ21 connector 96 and with the conventional RJ11 plugs and jacks shown in phantom at 95. The RJ21 connector half 96 on the NID 93 is connected to the mating RJ21 connector half 98 to establish the 25 pair connections. Each pair is connected to suitable cabling indicated at 100, which passes through the port 77 in weatherproof fashion and is connected at 102 to the appropriate terminal lugs on the corresponding socket in the electronics field plug mounting block 80. The other two lugs which correspond to those connected to cable 102 are connected by cable 104 to lugs on the corresponding socket in the protector field block 78. The other two lugs of the protector field socket are connected by cable 106 to the splice connector in the splice chamber shown diagrammatically at 108. This connector may be of the 710 or MS2 type and provides connection to the entering telephone cable. It will be understood that while only a single cable pair is illustrated at 100, 102, 104, 106, all 25 pairs will be suitably cabled in the conventional fashion and pass through the ports 77 and 38 in weatherproof fashion as through suitable grommets and/or sealing material.

Referring to FIG. 11 the telephone company cables enter through one or more ports 110, 112 in the bottom peripheral wall 18 of the cabinet 12. Provision is made for the acceptance of two cables in FIG. 11. The cable ports are formed by an elongated slot 114 extending from the front edge of the cabinet 116 to terminate in a rounded rear end 118. Provision for the acceptance of one or two cables is made by providing a separator closure bracket 120 having bifurcated ends to slide over the opposite surfaces of the edge of the slot 114. The separator or divider bracket 120 is curved as shown at 122 to accept the cables and for sealing thereto. In the situation where entry for only a single cable is desired the bracket 120 is not provided with a lower curvate portion but is extended in length to cover the entire remainder of opening 112 formed by the lower end of the slot 114 in FIG. 11. The other end of the slot 114 is closed by a bracket 124 having bifurcated sides and a curvate portion 126.

Referring to FIG. 10 the subscriber side connections 128 from the NID 93 are assembled in rungs 92 in cable fashion as shown at 130 to extend along the NID and downward in the cabinet through suitable wire rungs 132 mounted on the chassis 30.

Suitable cable ports for the service wires are provided in the bottom peripheral wall 18 as shown at 134 in FIG. 11. According to the invention ports for the telephone company cable as well as for the subscriber service cables may be provided both at the top wall 16 and the bottom wall 18 of the cabinet 12 for indoor use. In the case of cabinets intended for use outdoors cable ports are provided solely in the lower wall 18 for weather security purposes.

With the improved building entrance terminal cabinet of the invention it is possible to utilize a single size terminal enclosure to provide connection for 25 to 100 lines without the necessity of adding additional units.

The terminal may be expanded from 25 to 100 lines through the simple expedient of adding additional mounting panel modules. The entire terminal is modular in design, craft friendly, low in initial as well as maintenance cost, expandable, and similar for both indoor and outdoor applications. The terminal is provided with both protector and electronics fields which are constructed in such a manner as to preclude cross-connects or the use of loose wires individually terminated. The electronics devices are in the form of plug in modules which are interchangeable with metallic jumper or test units.

While the specific embodiment of plug in blocks for the protector and electronics fields are 25 pair units it is also feasible to use 50 pair blocks. Similarly while the preferred embodiment has been illustrated in the form of a four module cabinet it is also within the comprehension of the invention that a larger number of modules may be accommodated. The building entrance terminal cabinets of the invention are suitable to stacking in the event that additional connections become necessary as time passes. With the device of the invention it is possible to readily handle installations that may range from 25 up through approximately 500–600 lines. The device is not intended to serve high rise office buildings with several thousand lines.

The terminal of the invention is capable of growing on a gradual scale to spread the capital costs of new construction. Thus it is possible for an installation to be planned wherein the lowest cost portion of the installation, i.e., cost of bringing the cable in from the street, is brought in with large capacity while the higher cost installation in the building entrance terminal cabinet is built piecemeal. As a result the capital expense grows only in accord with the business growth in the particular building. The unit is particularly advantageous in that the components are conventional off-the-shelf components eliminating the need to stock for special purposes. The components of the terminal module panels are presently available and the terminal module panels may be stockpiled to make the expansion of units or the replacement of units a rapid low cost exercise.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A terminal module for mounting in a multi-module telephone network interface housing, said terminal module comprising:

self-supporting panel means;

first plug-in type connector means mounted on said panel means for receiving multiple protector means plugs, said first connector means having terminal means;

second plug-in type connector means mounted on said panel means in proximity to said first plug-in type connector means for receiving electronics means plugs, said second connector means having terminal means;

housing means on said panel means enclosing said connector means, said housing means having lockable access means to permit access to said connector means; and network interconnection means mounted on said panel means and having a first set of terminal means connected to terminal means on said second plug-in type connector means and a second set of terminal means for connection to telephone subscriber lines.

2. A terminal module according to claim 1 wherein said network interconnection means is releasably attached to said panel means by bracket means on said panel means.

3. A terminal module according to claim 2 wherein said connection between said network interconnection means terminal means and said second plug-in type connector terminal means includes third plug-in type connector means having one portion mounted on said network interconnection means and a mating portion thereof mounted to said panel means.

4. A terminal module according to claim 3 wherein said network interconnection means comprises a Network Interconnection Device (NID) including multiple RJ11 plugs and jacks mounted on said NID and connected between said third plug-in type connector means and connections to subscriber telephone lines.

5. A terminal module according to claim 4 wherein said network NID includes openable cover means for covering said RJ11 plugs and jacks.

6. A terminal module according to claim 5 wherein said NID comprises a 25 pair NID of the 8925 type and said third plug-in type connector means comprises an RJ21 connector.

7. A terminal module according to claim 1 wherein said housing means comprises a single enclosure for said first and second plug-in type connector means, said housing means having an openable door and locking means to form a lockable telephone company compartment.

8. A terminal module according to claim 2 including weatherproof port means in said panel means beneath said bracket means, said connections between said network interconnection means and said plug-in type connector means passing through said port means in weather-tight fashion.

9. A terminal module according to claim 1 including spaced wire cabling means on said panel means arranged along an axis substantially parallel to a longitudinal axis through said network interconnection means.

10. A telephone network interface apparatus comprising:

cabinet means having opposed front and back walls joined by peripheral wall means including top and bottom and side walls extending between said front and back walls, and having door means in said front wall;

substantially planar chassis means in said cabinet means extending substantially parallel to said back wall over a substantial portion thereof;

separator wall means extending substantially normal to said back wall and substantially parallel to and proximate a side wall to form between said separator wall means and said side wall a splice chamber;

said chassis means extending outward from the side of said separator wall means opposite to said splice chamber;

said chassis means having spaced openings for receiving and supporting spaced terminal modules.

11. A telephone network apparatus according to claim 10 wherein aid chassis means comprises plate means extending from said separator wall means substantially to the side wall distal from said separator wall means;

said plate means having multiple generally rectangular openings therein for receiving terminal modules with adjacent openings being separated by strips; support means extending between said back wall and said strips;

port means in said separator wall means between said plate means and said back wall for receiving cables extending from beneath the plane of said panel means at said openings.

12. Telephone network interface apparatus according to claim 11 including spaced wire cabling means mounted on said plate means adjacent the side wall distal from said separator wall means and disposed substantially along an axis extending parallel to said side wall between said side wall and a line formed by edges in said plate means formed by said generally rectangular openings.

13. Telephone network interface apparatus according to claim 12 including weatherproof port means in said bottom wall for receiving cable means extending from said splicing chamber out of said cabinet means.

14. Telephone network interface apparatus according to claim 13 including port means in said bottom wall of said cabinet means underlying said wire cabling means for carrying subscriber line cabling from said cabling means on said plate means.

15. A telephone network interface apparatus according to claim 10 including a terminal module mounted on said chassis means over one of said openings, said terminal module comprising panel means having mounted thereon telephone company compartment housing means having plug-in type connectors housed therein, and network interconnection device means mounted on said panel means exterior of said housing means for subscriber access.

16. A telephone network interface apparatus according to claim 15 including cabling extending in the space between said planar chassis means and said back wall from said plug-in type connectors in said telephone company compartment through said separator wall means and terminating in a connector in said splice chamber.

17. A telephone network interface apparatus according to claim 15 wherein said panel means has mounted thereon spaced wire cabling means adjacent said network interconnection device means receiving cabling extending parallel to a longitudinal axis of said network interconnection device means and extending through said spaced cabling means on said panel means.

18. A telephone network interface apparatus according to claim 15 wherein said network interconnection device means comprises a 25 pair NID of the 8925 type fastened to said panel means by releasable bracket means.

19. A telephone network interface apparatus according to claim 10 including a terminal module mounted on said chassis means over one of said openings, said module comprising:

self-supporting panel means;

first plug-in type connector means mounted on said panel means for receiving multiple protector means plugs, said first connector means having terminal means;

second plug-in type connector means mounted on said panel means in proximity to said first plug-in type connector means for receiving electronics means plugs, said second connector means having terminal means;

housing means on said panel means enclosing said connector means, said housing means having lockable access means to permit access to said connector means; and network interconnection means mounted on said panel and having a first set of terminal, means connected to terminal means on said second plug-in type connector means and a second set of terminal means for connection to telephone subscriber lines.

20. A telephone network interface apparatus according to claim 19 wherein said network interconnection means is releasably attached to said panel means by bracket means on said panel means.

21. A telephone network interface apparatus according to claim 20 wherein said connection between said second network interconnection means terminal means and said second plug-in type connector terminal means includes third plug-in type connector means having one portion thereof mounted on said network interconnection means and a mating portion mounted to said panel means.

22. A telephone network interface apparatus according to claim 21 wherein said network interconnection means comprises a Network Interconnection Device (NID) including multiple RJ11 plugs and jacks mounted on said NID and connected between said third plug-in type connector means and connections to subscriber telephone lines.

23. A telephone network interface apparatus according to claim 22 wherein said NID includes openable cover means for covering said RJ11 plugs and jacks.

24. A telephone network interface apparatus according to claim 23 wherein said NID comprises a 25 pair of the 8925 type and said third plug-in type connector means comprises an RJ21 connector.

25. A telephone network interface apparatus according to claim 19 wherein said housing means comprises a single enclosure for said first and second plug-in type connector means, said housing means having an openable door and locking means to form a lockable telephone company compartment.

26. A telephone network interface apparatus according to claim 20 including weatherproof port means in said panel means beneath said bracket means, said connections between said network interconnection means and said plug-in type connector means passing through said port means in weather-tight fashion.

27. A telephone network interface apparatus according to claim 19 including spaced wire cabling means on said panel means arranged along an axis substantially parallel to a longitudinal axis through said network interconnection means.

28. A terminal module for mounting in a multimodule telephone network interface housing, said terminal module comprising:

a substantially rectangular panel having flanges extending normal thereto at opposed sides thereof;

first plug-in type connector means mounted in an opening in said panel and being adapted to receive multiple removable protector plugs;

second plug-in type connector means mounted in an opening in said panel in proximity to said first plug-in type connector means for receiving electronics means plugs;

housing means mounted on said panel and enclosing the side of said plug-in type connector means adapted to receive said plugs, said housing means having lockable door means to provide access to plug-in type connector means; and network interconnection means mounted on said panel proximate said housing mans, aid network interconnection means being connected to said second plug-in type connector means and having plug and jack connections for telephone subscriber lines connectable to said network interconnection means.

29. A terminal module according to claim 28 wherein said network interconnection means is releasably attached to said panel by bracket means mounted on said panel.

30. A terminal module according to claim 29 wherein said network interconnection means includes one-half of a mating type connector for mating with the other half of such connector mounted on said panel so that the attachment of said network interconnection means to said panel via said bracket means provides substantially simultaneous establishment of electrical connection between said mating connector means.

31. A terminal module according to claim 30 wherein said network interconnection means comprises a Network Interconnection Device including multiple RJ11 plugs and jacks mounted on said NID and connected to the portion of said mating type connector carried by said network interconnection means.

32. A terminal module according to claim 31 wherein said NID includes openable cover means for covering said RJ11 plugs and jacks.

33. A terminal module according to claim 32 wherein said NID comprises a 25 pair NID of the 8925 type and said mating type connector comprises an RJ21 connector.

34. A terminal module according to claim 28 wherein said housing means comprises a single enclosure for said first and second plug-in type connector means, said housing means having a hinged door and locking means therefor.

35. A terminal module according to claim 34 including weatherproof port means in said panel beneath said bracket means, said connections between said network interconnection means and said plug-in type connector means passing through said port means in weather-tight fashion.

36. A terminal module according to claim 35 including spaced wire cabling means on said panel arranged on an axis substantially parallel to a longitudinal axis through said network interconnection means.

* * * * *